(12) United States Patent
Raman et al.

(10) Patent No.: US 12,211,128 B2
(45) Date of Patent: Jan. 28, 2025

(54) METHOD AND SYSTEM FOR PROVIDING VISUAL TEXT ANALYTICS

(71) Applicant: JPMorgan Chase Bank, N.A., New York, NY (US)

(72) Inventors: Natraj Raman, London (GB); Sameena Shah, Scarsdale, NY (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 55 days.

(21) Appl. No.: 17/643,497

(22) Filed: Dec. 9, 2021

(65) Prior Publication Data

US 2022/0222878 A1    Jul. 14, 2022

Related U.S. Application Data

(60) Provisional application No. 63/137,445, filed on Jan. 14, 2021.

(51) Int. Cl.
*G06T 11/60* (2006.01)
*G06F 40/137* (2020.01)
(Continued)

(52) U.S. Cl.
CPC ............ *G06T 11/60* (2013.01); *G06F 40/137* (2020.01); *G06F 40/216* (2020.01); *G06V 30/40* (2022.01)

(58) Field of Classification Search
CPC ... G06T 11/60; G06T 2200/24; G06F 40/137; G06F 40/216; G06F 18/2323; G06F 40/205; G06F 40/284; G06V 30/40
See application file for complete search history.

(56) References Cited

U.S. PATENT DOCUMENTS

| 6,801,229 B1* | 10/2004 | Tinkler | G06F 3/0482 707/E17.141 |
| 2011/0113385 A1* | 5/2011 | Sayers | G06F 16/954 715/853 |

(Continued)

OTHER PUBLICATIONS

Yue Lu, Zhe Wang, and Chew Lim Tan. 2004. Word grouping in document images based on Voronoi tessellation. In International Workshop on Document Analysis Systems. Springer Berlin, pp. 147-157. (Year: 2004).*

*Primary Examiner* — Said Broome
*Assistant Examiner* — Andrew Shin
(74) *Attorney, Agent, or Firm* — GREENBLUM & BERSTEIN, P.L.C.

(57) ABSTRACT

A method and a system for providing a visual representation of textual information is provided. The method includes: receiving a corpus that includes documents containing textual information; analyzing the textual information by applying a text analytics algorithm thereto; generating a visual representation of the textual information based on a result of the analysis; and displaying the visual representation on a graphical user interface (GUI) that includes mechanisms for facilitating user interaction therewith. The visual representation be any one of a hypergraph that encodes a distributional similarity between words included in the textual information, a multi-level radial layout that captures distinguishing terms included in the textual information, a clutter-free parallel coordinate plot of topic relations with respect to the textual information, a nested topology of hierarchical relations with respect to the textual information, and a tessellated plane that highlights boundary points with respect to the textual information.

17 Claims, 13 Drawing Sheets

(51) Int. Cl.
*G06F 40/216* (2020.01)
*G06V 30/40* (2022.01)

(56) References Cited

U.S. PATENT DOCUMENTS

| | | | | |
|---|---|---|---|---|
| 2012/0323918 | A1* | 12/2012 | Shi | G06F 16/35 |
| | | | | 707/E17.089 |
| 2015/0120717 | A1* | 4/2015 | Kim | G06F 16/335 |
| | | | | 707/727 |
| 2015/0339273 | A1* | 11/2015 | Yang | G06T 11/206 |
| | | | | 707/723 |
| 2019/0089193 | A1* | 3/2019 | Ranjan | G09G 5/14 |
| 2020/0265075 | A1* | 8/2020 | Knapp | G06F 16/335 |
| 2021/0209500 | A1* | 7/2021 | Hu | G06N 5/04 |
| 2022/0171936 | A1* | 6/2022 | Wang | G06F 40/289 |

* cited by examiner

METHOD AND SYSTEM FOR PROVIDING VISUAL TEXT ANALYTICS

CROSS-REFERENCE TO RELATED APPLICATIONS

This application claims priority benefit from U.S. Provisional Application No. 63/137,445, filed Jan. 14, 2021, which is hereby incorporated by reference in its entirety.

BACKGROUND

1. Field of the Disclosure

This technology generally relates to methods and systems for providing visual text analytics, and more particularly to methods and systems for providing visual representations of textual information such as hypergraphs, nested topologies, and tessellated planes.

2. Background Information

Despite admirable progress in machine learning, human participation in data analysis and decision making is a reality. It is important to design intuitive visualizations that can exploit the pattern recognition and spatial reasoning capabilities of humans. While conventional bar charts and heat map displays hold value, complex interactive graphical representations are often required to effectively analyze high-dimensional data. Further, it is essential for the visuals to encode all of the features delivered by machine learning models.

Combining the abilities of statistical models with intuitive visual representations is particularly relevant when dealing with text documents. Human analysts are often required to review textual material, and due to the sheer volume, lack of structure, and multi-faceted nature, large complex text corpora pose a significant challenge. Conventional efforts around visual text analytics have not characterized the true potential of the algorithms, have been tied to a particular model, and/or have remained fragmented with task-specific solutions.

Accordingly, there is a need for a mechanism to provide visual representations of textual information such as hypergraphs, nested topologies, and tessellated planes.

SUMMARY

The present disclosure, through one or more of its various aspects, embodiments, and/or specific features or sub-components, provides, inter alia, various systems, servers, devices, methods, media, programs, and platforms for providing visual representations of textual information such as hypergraphs, nested topologies, and tessellated planes.

According to an aspect of the present disclosure, a method for providing visual representations of textual information is provided. The method is implemented by at least one processor. The method includes: receiving a corpus that includes at least one document containing textual information; analyzing the textual information; and generating a visual representation of the textual information based on a result of the analyzing of the textual information.

The visual representation may include at least one from among a hypergraph that encodes a distributional similarity between words included in the textual information, a multi-level radial layout that captures distinguishing terms included in the textual information, a clutter-free parallel coordinate plot of topic relations with respect to the textual information, a network cluster diagram that captures spatial relations between the textual information, a nested topology of hierarchical relations with respect to the textual information, and a tessellated plane that highlights boundary points with respect to the textual information.

The analyzing may include applying, to the textual information, a text analytics algorithm that is based on at least one from among a classical linguistic pattern recognition method and a neural language modeling method.

The method may further include displaying the visual representation on a graphical user interface (GUI) that includes at least one mechanism for facilitating user interaction with the visual representation of the textual information.

The GUI may include a first section that displays actions and customization options that are available to a user, a second section that displays the visual representation of the textual information, and a third section that displays contextual information that relates to the visual representation.

The first section may include a drop-down menu that prompts a user to select a visual representation type from among a predetermined plurality of visual representation types.

The at least one mechanism for facilitating user interaction may include at least one from among a zoom mechanism for controlling a size of the visual representation, a pan mechanism for shifting a central position of the visual representation, and a hover and click mechanism for accessing contextual information that relates to the visual representation.

The generating of the visual representation may include using at least one from among color coding, opacity, and line thickness for illustrating interrelationships between textual elements that are determined as a result of the analyzing of the textual information.

According to another aspect of the present disclosure, a computing apparatus for providing a visual representation of textual information is provided. The computing apparatus includes a processor; a memory; a display; and a communication interface coupled to each of the processor, the memory, and the display. The processor is configured to: receive, via the communication interface, a corpus that includes at least one document containing textual information; analyze the textual information; and generate a visual representation of the textual information based on a result of the analysis of the textual information.

The visual representation may include at least one from among a hypergraph that encodes a distributional similarity between words included in the textual information, a multi-level radial layout that captures distinguishing terms included in the textual information, a clutter-free parallel coordinate plot of topic relations with respect to the textual information, a network cluster diagram that captures spatial relations between the textual information, a nested topology of hierarchical relations with respect to the textual information, and a tessellated plane that highlights boundary points with respect to the textual information.

The processor may be further configured to apply, to the textual information, a text analytics algorithm that is based on at least one from among a classical linguistic pattern recognition method and a neural language modeling method.

The processor may be further configured to display, on the display, the visual representation on a graphical user interface (GUI) that includes at least one mechanism for facilitating user interaction with the visual representation of the textual information.

The GUI may include a first section that displays actions and customization options that are available to a user, a second section that displays the visual representation of the textual information, and a third section that displays contextual information that relates to the visual representation.

The first section may include a drop-down menu that prompts a user to select a visual representation type from among a predetermined plurality of visual representation types.

The at least one mechanism for facilitating user interaction may include at least one from among a zoom mechanism for controlling a size of the visual representation, a pan mechanism for shifting a central position of the visual representation, and a hover and click mechanism for accessing contextual information that relates to the visual representation.

The processor may be further configured to generate the visual representation by using at least one from among color coding, opacity, and line thickness for illustrating interrelationships between textual elements that are determined as a result of the analysis of the textual information.

According to yet another aspect of the present disclosure, a non-transitory computer readable storage medium storing instructions for providing a visual representation of textual information is provided. The storage medium includes executable code which, when executed by a processor, causes the processor to: receive a corpus that includes at least one document containing textual information; analyze the textual information; and generate a visual representation of the textual information based on a result of the analysis of the textual information.

The visual representation may include at least one from among a hypergraph that encodes a distributional similarity between words included in the textual information, a multi-level radial layout that captures distinguishing terms included in the textual information, a clutter-free parallel coordinate plot of topic relations with respect to the textual information, a network cluster diagram that captures spatial relations between the textual information, a nested topology of hierarchical relations with respect to the textual information, and a tessellated plane that highlights boundary points with respect to the textual information.

The executable code may be further configured to cause the processor to apply, to the textual information, a text analytics algorithm that is based on at least one from among a classical linguistic pattern recognition method and a neural language modeling method.

The executable code may be further configured to cause the processor to display the visual representation on a graphical user interface (GUI) that includes at least one mechanism for facilitating user interaction with the visual representation of the textual information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
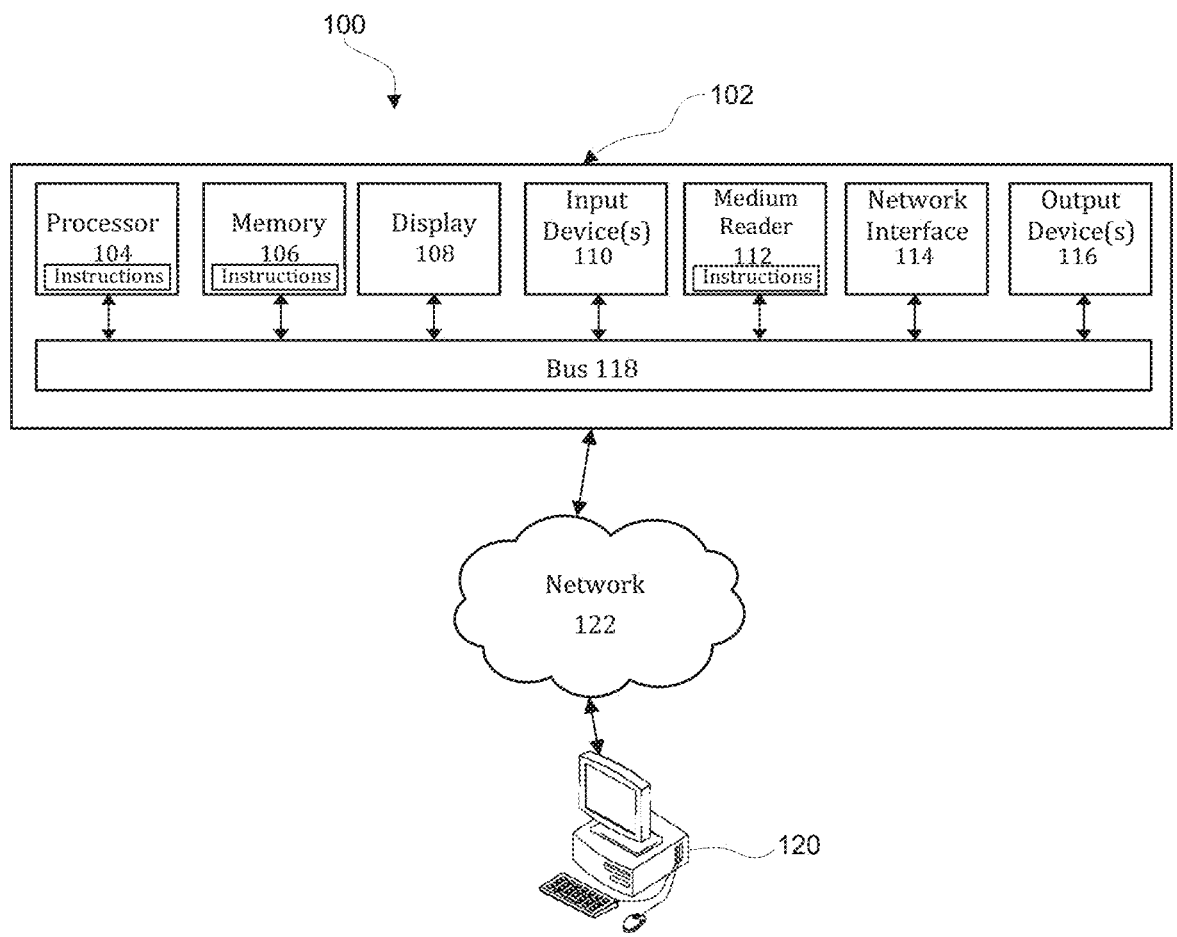
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing visual representations of textual information such as hypergraphs, nested topologies, and tessellated planes.

Figure 2:
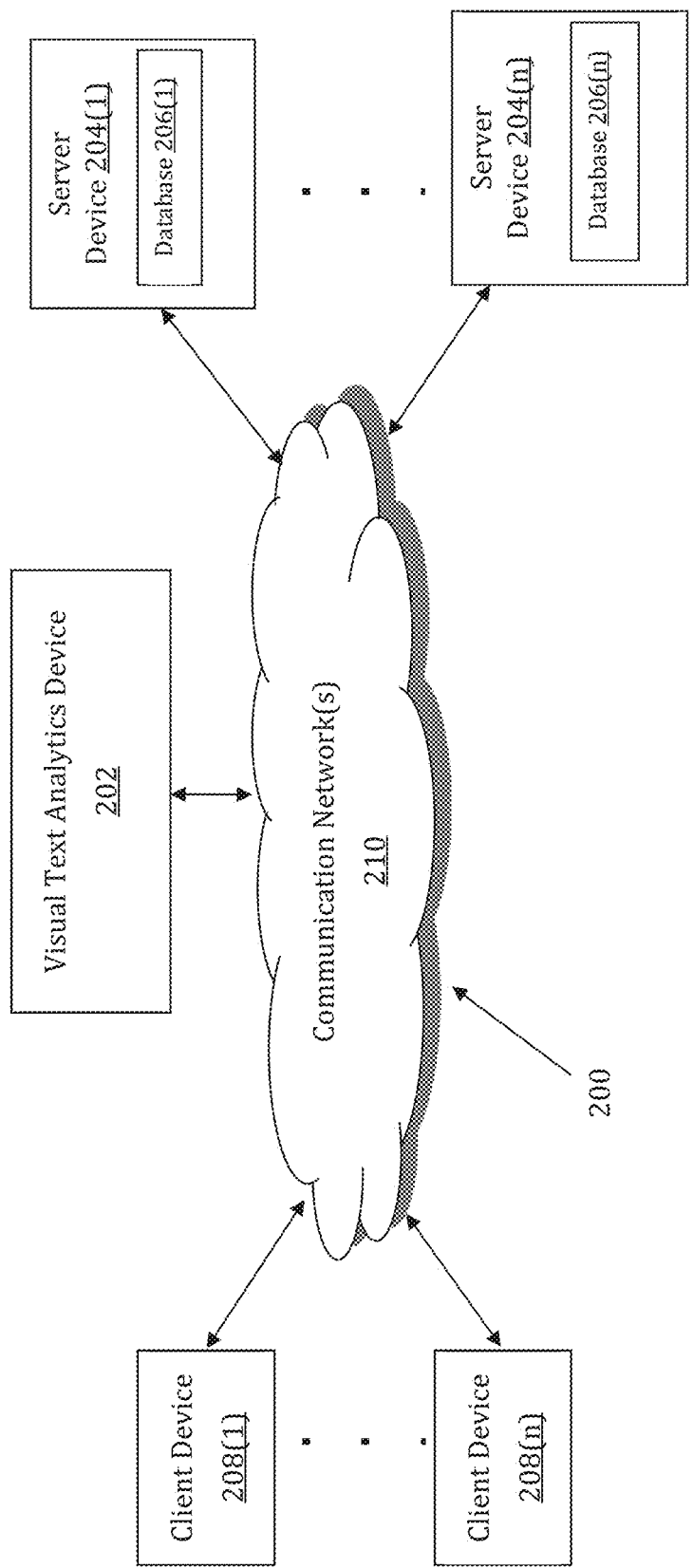
FIG. 2 illustrates an exemplary diagram of a network environment.

Referring to FIG. 2, a schematic of an exemplary network environment 200 for implementing a method for providing visual representations of textual information such as hypergraphs, nested topologies, and tessellated planes is illustrated. In an exemplary embodiment, the method is executable on any networked computer platform, such as, for example, a personal computer (PC).

The method for providing visual representations of textual information such as hypergraphs, nested topologies, and tessellated planes may be implemented by a Visual Text Analytics (VTA) device 202. The VTA device 202 may be the same or similar to the computer system 102 as described with respect to FIG. 1. The VTA device 202 may store one or more applications that can include executable instructions that, when executed by the VTA device 202, cause the VTA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VTA device 202 itself, may be located in virtual server(s) running in a cloud-based computing environment rather than being tied to one or more specific physical network computing devices. Also, the application(s) may be running in one or more virtual machines (VMs) executing on the VTA device 202. Additionally, in one or more embodiments of this technology, virtual machine(s) running on the VTA device 202 may be managed or supervised by a hypervisor.

In the network environment 200 of FIG. 2, the VTA device 202 is coupled to a plurality of server devices 204(1)-204(n) that hosts a plurality of databases 206(1)-206(n), and also to a plurality of client devices 208(1)-208(n) via communication network(s) 210. A communication interface of the VTA device 202, such as the network interface 114 of the computer system 102 of FIG. 1, operatively couples and communicates between the VTA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VTA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and VTA devices that efficiently implement a method for providing visual representations of textual information such as hypergraphs, nested topologies, and tessellated planes.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VTA device 202 may be a standalone device or integrated with one or more other devices or apparatuses, such as one or more of the server devices 204(1)-204(n), for example. In one particular example, the VTA device 202 may include or be hosted by one of the server devices 204(1)-204(n), and other arrangements are also possible. Moreover, one or more of the devices of the VTA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the VTA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to corpora of documents and data that relates to visualizations of text analytics.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the VTA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the VTA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the VTA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VTA device 202, the server devices 204(1)-204(n), or the client devices 208(1)-208(n), for example, may be configured to operate as virtual instances on the same physical machine. In other words, one or more of the VTA device 202, the server devices 204(1)-204(n), or the client devices 208(1)-208(n) may operate on the same physical device rather than as separate devices communicating through communication network(s) 210. Additionally, there may be more or fewer VTA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
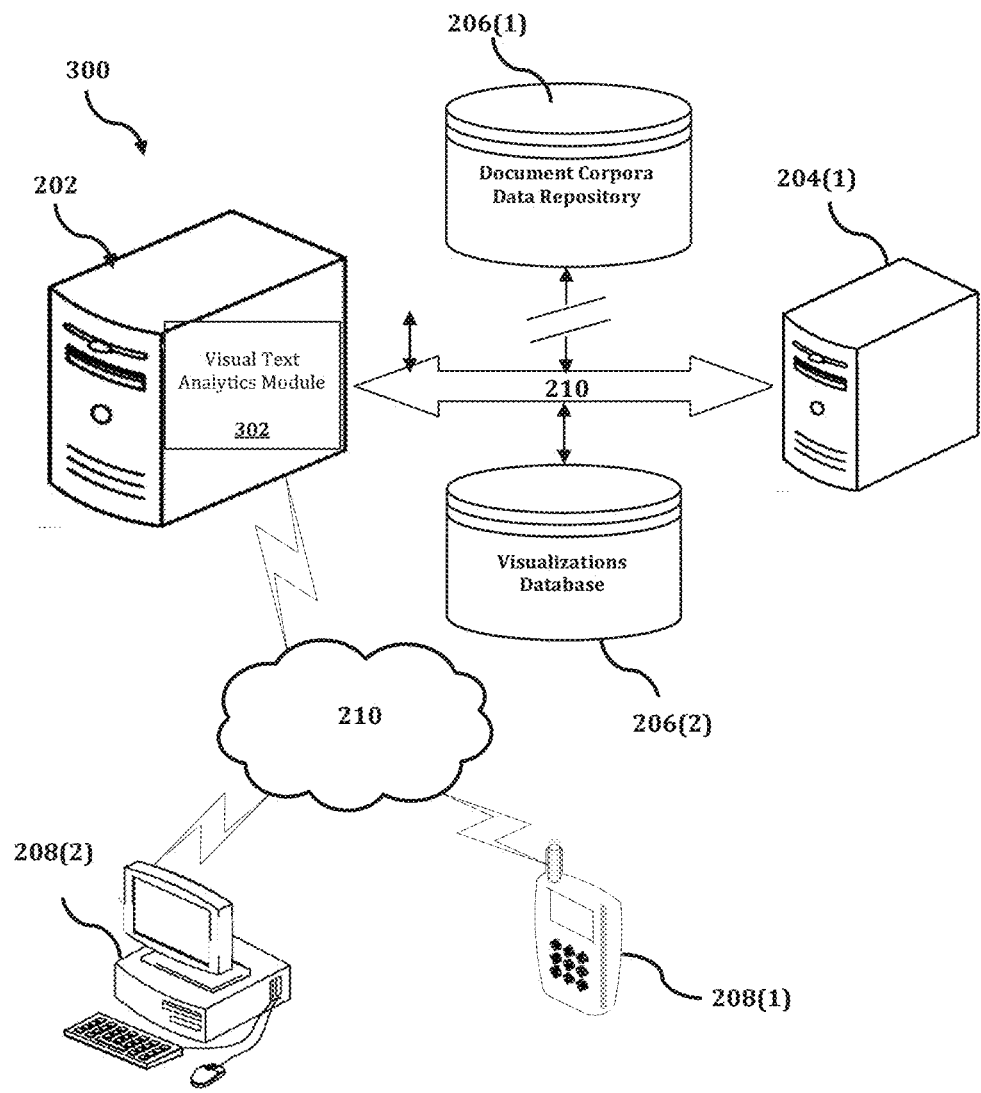
FIG. 3 shows an exemplary system for implementing a method for providing visual representations of textual information such as hypergraphs, nested topologies, and tessellated planes.

The VTA device 202 is described and illustrated in FIG. 3 as including a visual text analytics module 302, although it may include other rules, policies, modules, databases, or applications, for example. As will be described below, the visual text analytics module 302 is configured to implement a method for providing visual representations of textual information such as hypergraphs, nested topologies, and tessellated planes.

An exemplary process 300 for implementing a mechanism for providing visual representations of textual information such as hypergraphs, nested topologies, and tessellated planes by utilizing the network environment of FIG. 2 is illustrated as being executed in FIG. 3. Specifically, a first client device 208(1) and a second client device 208(2) are illustrated as being in communication with VTA device 202. In this regard, the first client device 208(1) and the second client device 208(2) may be "clients" of the VTA device 202 and are described herein as such. Nevertheless, it is to be known and understood that the first client device 208(1) and/or the second client device 208(2) need not necessarily be "clients" of the VTA device 202, or any entity described in association therewith herein. Any additional or alternative relationship may exist between either or both of the first client device 208(1) and the second client device 208(2) and the VTA device 202, or no relationship may exist.

Further, VTA device 202 is illustrated as being able to access a document corpora data repository 206(1) and a visualizations database 206(2). The visual text analytics module 302 may be configured to access these databases for implementing a method for providing visual representations of textual information such as hypergraphs, nested topologies, and tessellated planes.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the VTA device 202 via broadband or cellular communication. Of course, these embodiments are merely exemplary and are not limiting or exhaustive.

Upon being started, the visual text analytics module 302 executes a process for providing visual representations of textual information such as hypergraphs, nested topologies, and tessellated planes. An exemplary process for providing visual representations of textual information such as hypergraphs, nested topologies, and tessellated planes is generally indicated at flowchart 400 in FIG. 4.

Figure 4:
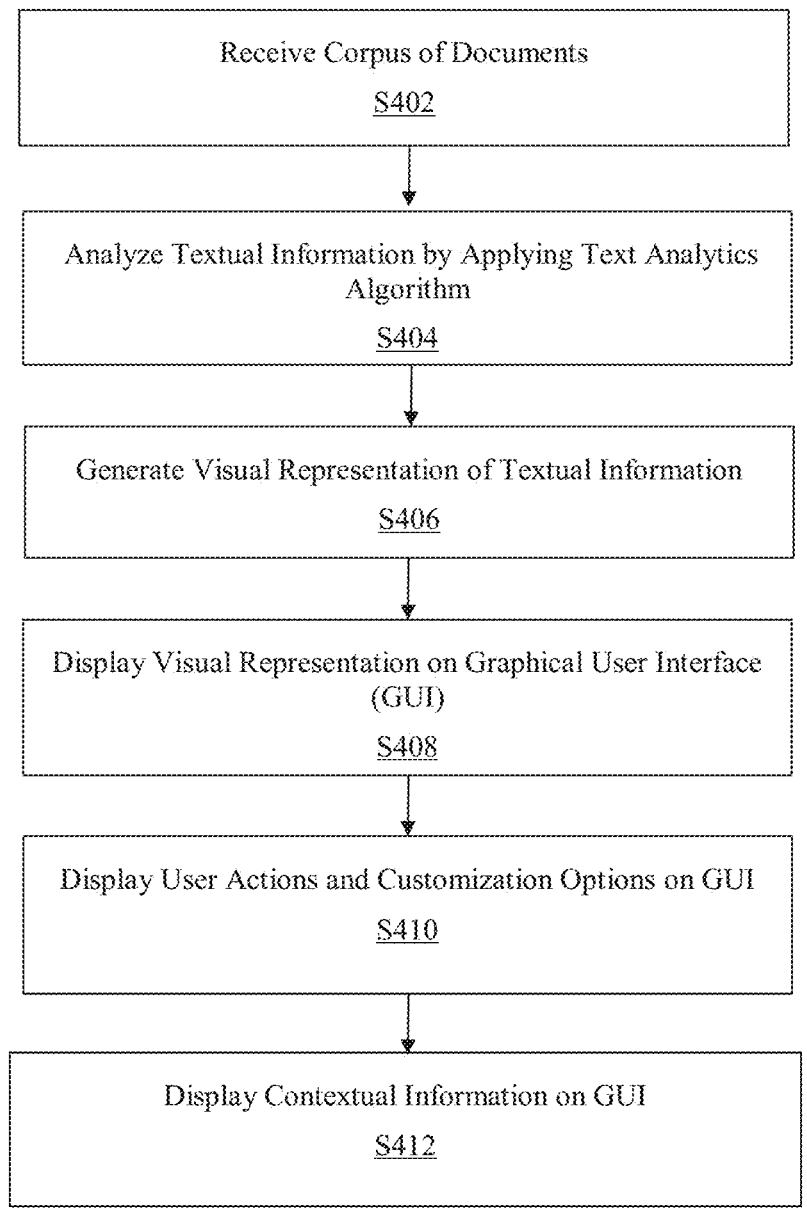
FIG. 4 is a flowchart of an exemplary process for implementing a method for providing visual representations of textual information such as hypergraphs, nested topologies, and tessellated planes.

In process 400 of FIG. 4, at step S402, the visual text analytics module 302 receives a corpus of documents. The documents contain textual information.

At step S404, the visual text analytics module 302 analyzes the textual information included in the corpus. In an exemplary embodiment, the analyzing is performed by applying a text analytics algorithm to the textual information. The text analytics algorithm may be an artificial intelligence (AI) algorithm that uses a machine learning technique and is based on a classical linguistic pattern recognition method and/or a neural language modeling method.

At step S406, the visual text analytics module 302 generates a visual representation of the textual information. The visual representation may include any one or more of a hypergraph that encodes a distributional similarity between words included in the textual information, a multi-level radial layout that captures distinguishing terms included in the textual information, a clutter-free parallel coordinate plot of topic relations with respect to the textual information, a network cluster diagram that captures spatial relations between the textual information, a nested topology of hierarchical relations with respect to the textual information, and a tessellated plane that highlights boundary points with respect to the textual information. The visual representation may use any one or more of color coding, opacity, line thickness, and/or any other suitable technique for illustrating interrelationships between textual elements that are determined as a result of the analysis performed in step S404.

At step S408, the visual text analytics module 302 displays the visual representation of the textual information on a graphical user interface (GUI). In an exemplary embodiment, the GUI may include one or more mechanisms for facilitating user interaction with the visual representation of the textual information. For example, the GUI may include any one or more of a zoom mechanism for controlling a size of the visual representation, a pan mechanism for shifting a central position of the visual representation, and a hover and click mechanism for accessing contextual information that relates to the visual representation.

At step S410, the visual text analytics module 302 displays actions and customization options that are available to a user on the GUI. The user actions and options may include, for example, a drop-down menu that prompts a user to select a desired type of visual representation.

At step S412, the visual text analytics module 302 displays contextual information that relates to the visual representation on the GUI. In an exemplary embodiment, the GUI may include three sections: a left panel that displays the user actions and customization options; a center panel that displays the visual representation; and a right panel that displays the contextual information.

In an exemplary embodiment, an integrated platform that can provide perceptive visualizations independent of an underlying model and cater to analysis at various levels of task granularity is provided. An interactive studio that delivers novel visual representations for common text oriented tasks such as theme discovery, document organization, and label exploration is disclosed. Visualization types include a hypergraph that encodes distributional similarity between words, a multi-level radial layout to capture distinguishing terms, a clutter-free parallel coordinate plot of topic relations, a nested topology of hierarchical relations, and a tessellated plane to highlight boundary points. All of the graphical elements are interactive, such that an end user is able to zoom, pan, hover, and click for obtaining textual information. The user merely requires a web browser to access the visuals.

In an exemplary embodiment, the studio follows a plug-in architecture with the visualization techniques decoupled from the text mining algorithms. This allows the introduction of a range of statistical models that can be parameterized, thus offering flexible choices for the user. Any text corpus can be integrated with the studio by transforming the data to conform to a well-defined interface. Of particular focus are a metadata-rich corpus with multiple facets or data dimensions along which a corpus may be subdivided. The domain-agnostic nature of the visuals is illustrated by using publicly available datasets that span across informal, legal, and scientific language formats.

Figure 5:
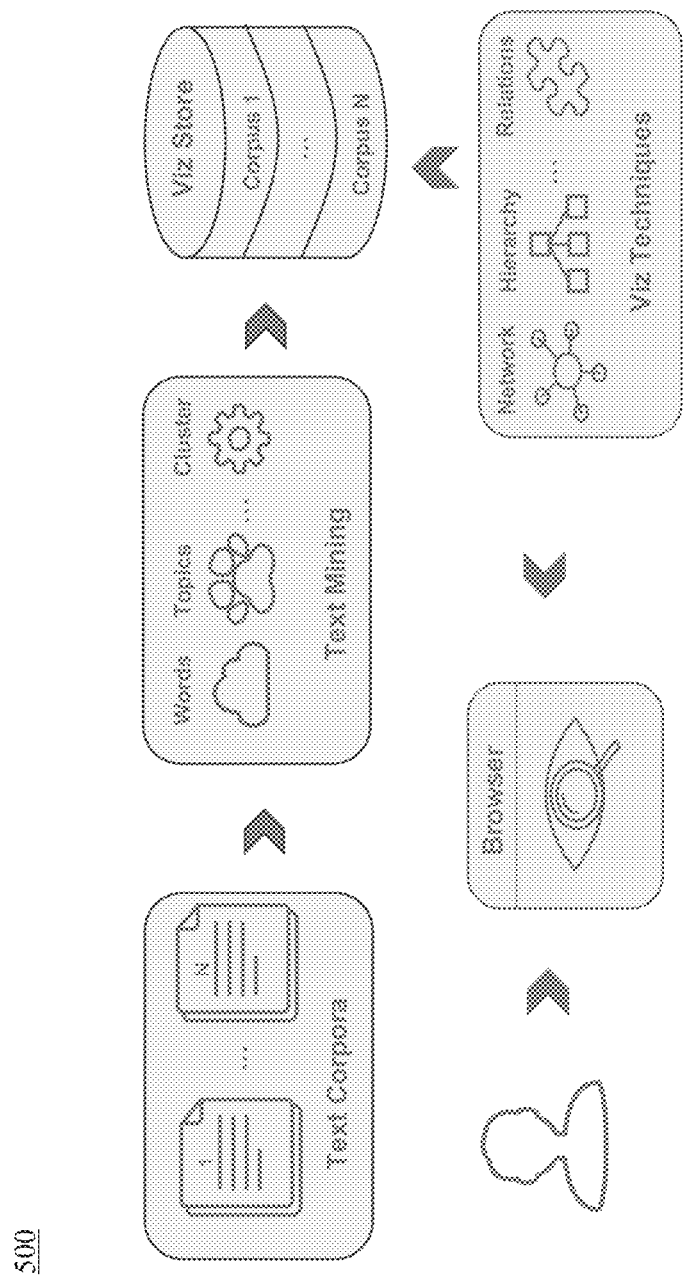
FIG. 5 is a block diagram that illustrates a system architecture for implementing a method for providing visual representations of textual information, according to an exemplary embodiment.

System Design: FIG. 5 is a block diagram 500 that illustrates a system architecture for implementing a method for providing visual representations of textual information, according to an exemplary embodiment. In an exemplary embodiment, the framework follows a loosely coupled architecture pattern that reduces dependencies between components in order to simplify extensibility, promote reuse, and enable easy maintenance. Referring to FIG. 5, there are three main components that drive the system: a text corpus, a suite of text analytics algorithms, and a set of visualization techniques.

In an exemplary embodiment, a text corpus is first transformed to a format that captures the various facets in the data and provides a uniform unit for analysis. This ensures that the system is domain agnostic and can accommodate various levels of granularity. The text analytics algorithms that can be plugged in range from classical linguistic pattern recognition methods to recent neural language modeling, with a potential interconnected pipeline. The outputs produced by the algorithms along with their parameters are persisted to avoid any perceived lag during interaction. The visualization techniques utilize this information to generate graphical representations in a vector format that is rendered in a web browser.

Figure 7:
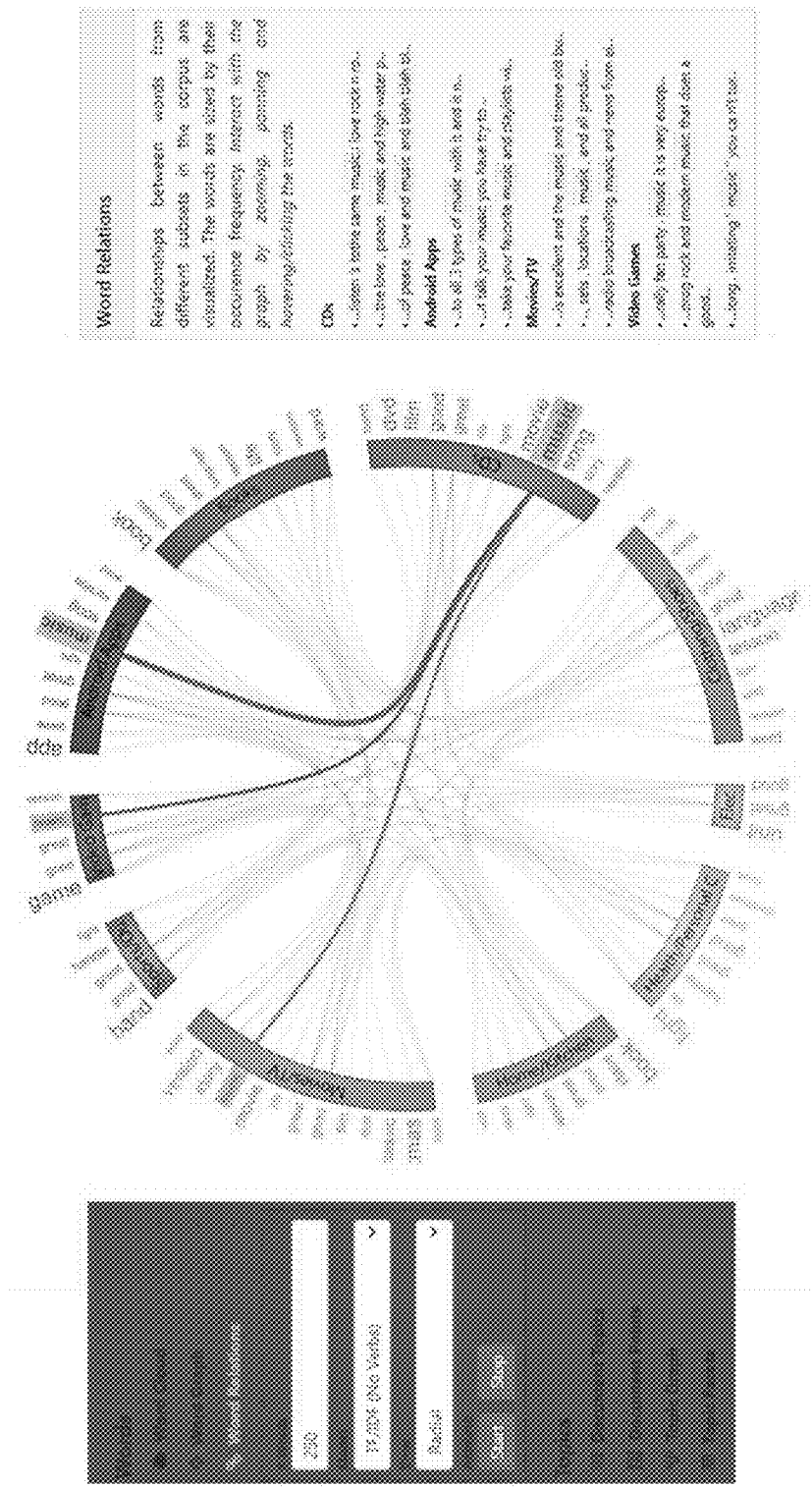
FIG. 7 is an exemplary radial layout that illustrates relations between words across different subsets that is a possible output of a method for providing visual representations of textual information, according to an exemplary embodiment.

Referring also to FIG. 7, in an exemplary embodiment, the user interface 700 has three main elements: a left pane that displays the actions and customization options that are available to the user; a middle pane that displays an interactive graphic, and a right pane that provides contextual information.

Visualizations: In an exemplary embodiment, a cross-section of capabilities available in the studio is described below. Samples from three different data sets, i.e., Amazon Reviews, Arxiv Abstracts, and the Code of Federal Regulations (CFR), are used to illustrate the visualizations.

Figure 6:
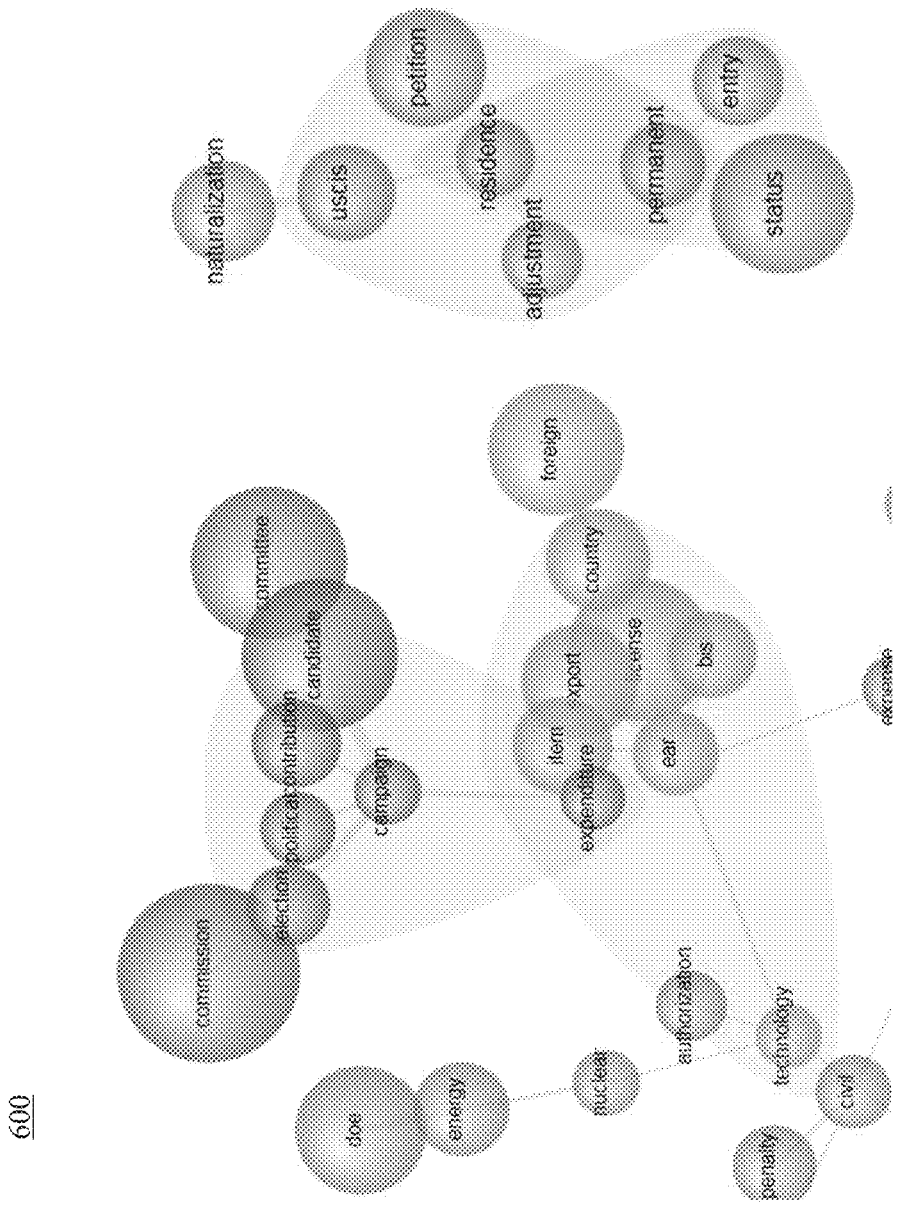
FIG. 6 is an exemplary hypergraph that depicts word co-occurrences that is a possible output of a method for providing visual representations of textual information, according to an exemplary embodiment.

Word Hypergraph: FIG. 6 is an exemplary hypergraph 600 that depicts word co-occurrences that is a possible output of a method for providing visual representations of textual information, according to an exemplary embodiment. A usual first step in text analytics is to plot the frequency of words in the corpus with a word cloud. However, the absence of context limits the ability of a word cloud visual to provide any insights beyond a basic overview. Following the principle of "characterizing a word by the company it keeps," the co-occurrence of words may be depicted in order to indicate semantic proximity. Rather than a structure-less cloud visual, in an exemplary embodiment, a graph format with word nodes that are inter-connected by weighted edges is used. The words are scaled by a measure of how often they appear and color-coded by their dominant facet. The co-occurrence strength between words is encoded in the edge thickness.

Further, hyper-edges are used to connect the linked nodes that share the same color. This allows the user to identify words that are central to characterizing a particular subset of the corpus. For example, referring to hypergraph 600, by paying attention to the hyper-edges connecting the nodes for "air," "flight," "passenger," and "aircraft," a user may conclude that "flight" is a keyword in the Aeronautics subset of the CFR corpus, while words such as "operation" or "access" are more ambiguous in describing the corpus.

Word Relations: FIG. 7 is an exemplary radial layout 700 that illustrates relations between words across different subsets and that is a possible output of a method for providing visual representations of textual information, according to an exemplary embodiment. Domain experts are often interested in understanding how subsets of a text collection differ. The identification of terms that are distinct to particular subsets may aid in this effort. To achieve this, a radial layout of the top relevant terms that are shared across the various subsets may be constructed. Each subset occupies a non-uniform slice based on its bandwidth in an inner concentric circle while its corresponding terms appear along the outer circle. The prominence of a term to a particular subset may be reflected by its font size. The relations between the terms may be modeled as a B-Spline curve in order to reduce visual clutter. The curve is drawn with a linear interpolation of the term colors and its width depends on the relationship strength.

The radial layout 700 shows the relation between word across different facets of the Amazon corpus, with the word "music" being shared between "CDs," "Android Apps," "Movies/TV," and "Video Games". Text snippets describing the context around "music" are revealed in the right pane of the graphical user interface. Users can optionally trigger an animated view that assists in highlighting the dominant relations.

Figure 8:
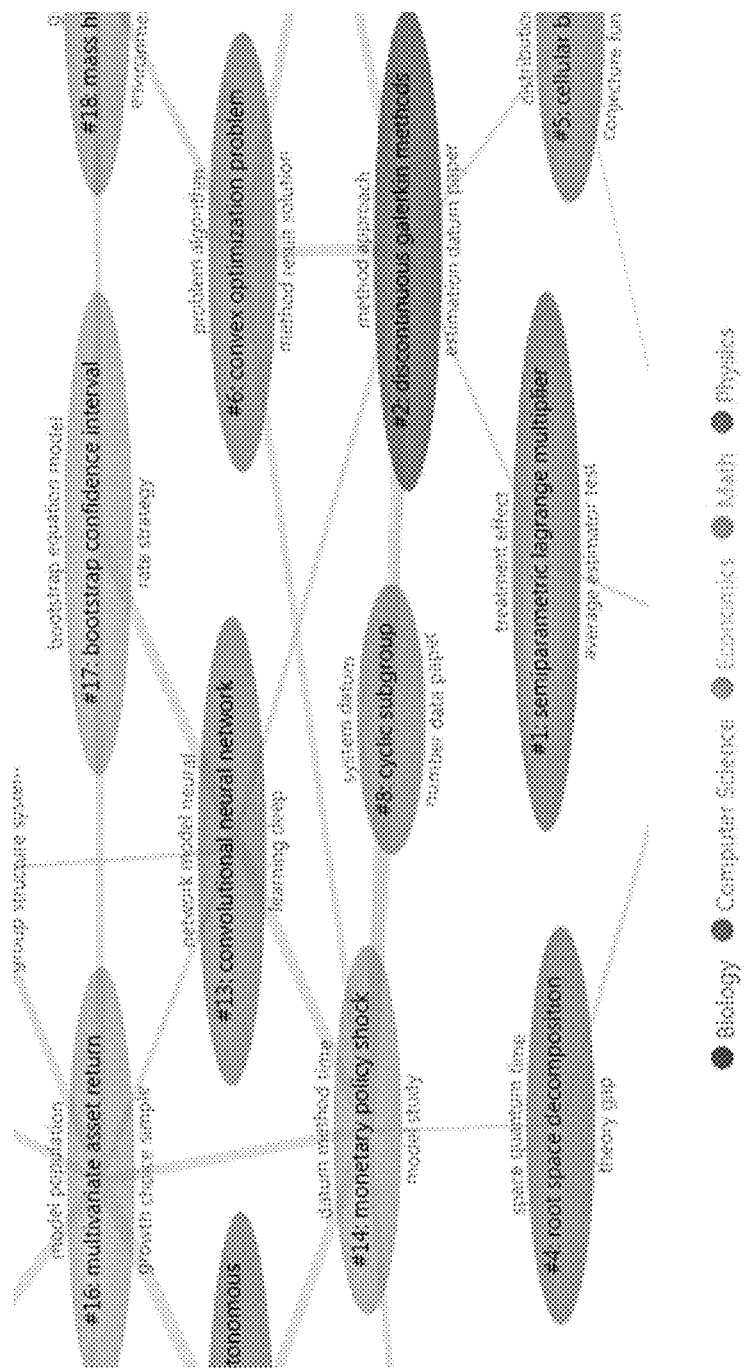
FIG. 8 is an exemplary topic graph encoded with correlations, coherence, and labels that is a possible output of a method for providing visual representations of textual information, according to an exemplary embodiment.

Topic Graph: FIG. 8 is an exemplary topic graph 800 encoded with correlations, coherence, and labels that is a possible output of a method for providing visual representations of textual information, according to an exemplary embodiment. Summarizing a corpus using a small set of underlying topics is a popular text mining technique for discovering semantic structures. Three novel features are provided: an ability to capture correlations between topics; an ability to rank a topic by the significance of its semantic content; and an ability to associate meaningful labels with a topic. Consequently, the topics are now represented as a graph with the links between topic nodes denoting the extent of their correlation. While a node is colored by the dominant facet of its topic, its opacity is controlled by the significance of the topic. Thus, topics that are less coherent are de-emphasized, thereby blending into the background. In an exemplary embodiment, both the automatically extracted topic label and the top ranked terms of a topic are displayed, with the latter decorated in an elliptical arc around a node.

The utility of this visualization is evident in the topic graph 800. The presence of labels such as "convex optimization problem" and "multivariate asset return" makes the topic theme of the Arxiv corpus more interpretable than merely viewing a generic term such as "problem" or "model".

Figure 9:
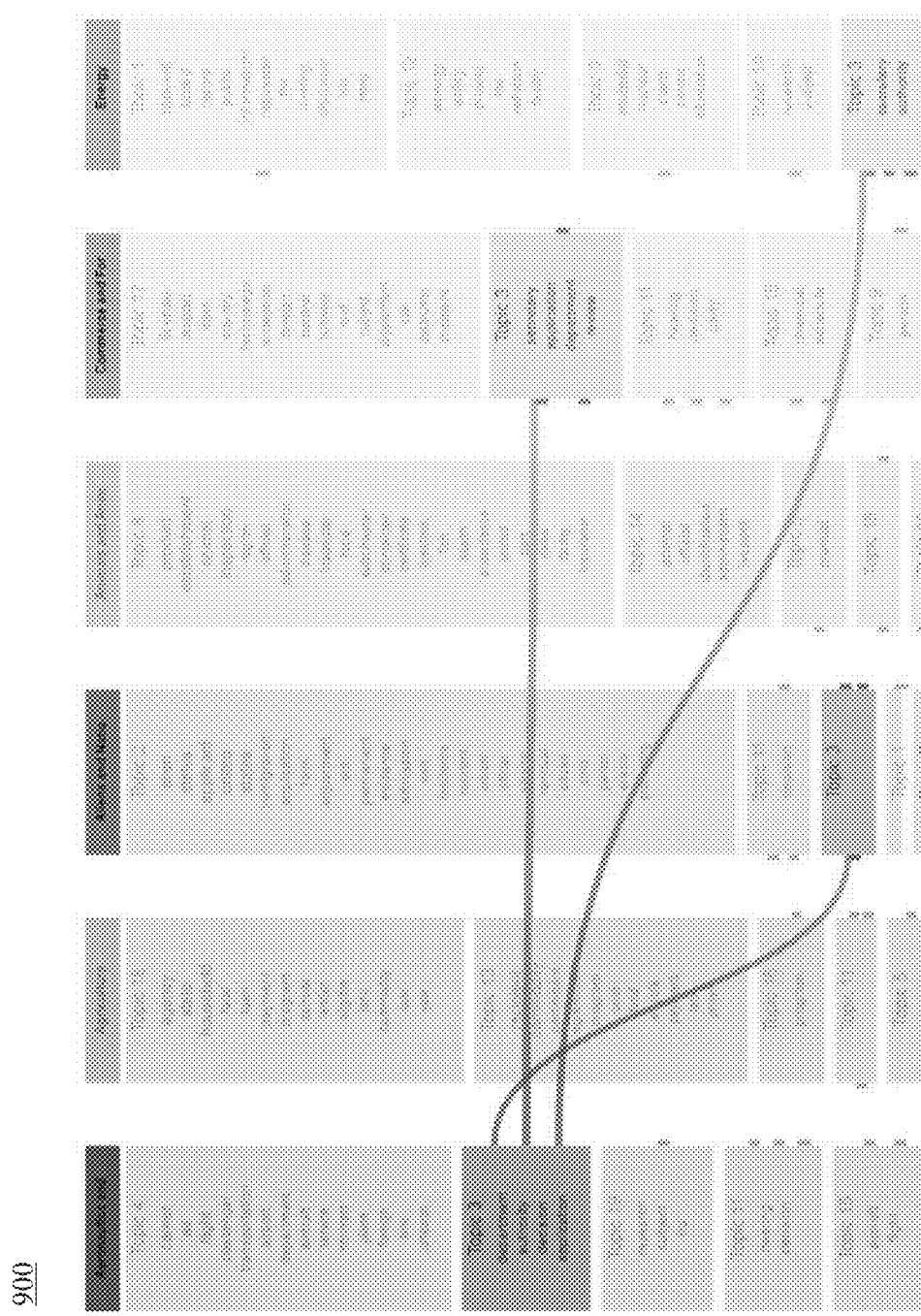
FIG. 9 is an exemplary topic relations chart rendered using a parallel coordinate plot and clipped edges that is a possible output of a method for providing visual representations of textual information, according to an exemplary embodiment.

Topic Relations: FIG. 9 is an exemplary topic relations chart 900 rendered using a parallel coordinate plot and clipped edges that is a possible output of a method for providing visual representations of textual information, according to an exemplary embodiment. It is useful to discover differentiating topics across corpus subsets, similar to the identification of distinguishing words. However, it is difficult to accommodate the additional topic level grouping in the radial layout described above without disrupting legibility. Hence, in an exemplary embodiment, a parallel coordinate representation is employed in order to portray this high-dimensional data. In an exemplary embodiment, the subsets are visualized along parallel columns and the top ranked topics for a subset are scaled by their corresponding topic distributions. The topic terms themselves are relatively sized.

Naively showing all of the links between related topics would clutter the visual. Hence, in an exemplary embodiment, the edges appear clipped by default, and are expanded only when the user hovers over a topic of interest. This is illustrated in the topic relations chart 900, with the full links shown only for "Topic 3" and the rest of the elements are deemphasized. The user can judge whether a topic is distinctive or not from the presence or absence of the clipped edges. For example, unlike "Topic 1," "Topic 2" does not contain any edge implying that it captures "Aliens" subset-specific terms.

Figure 10:
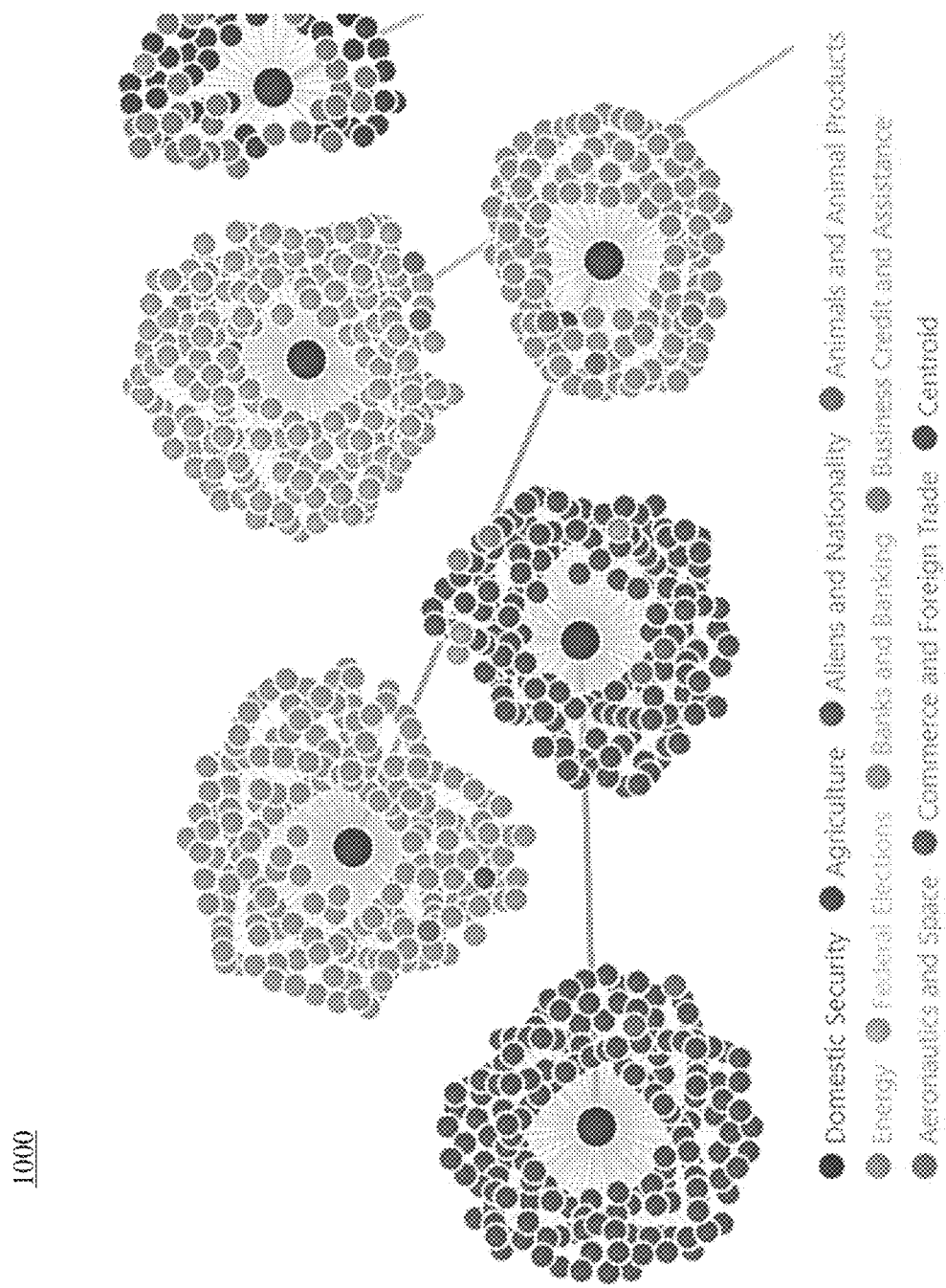
FIG. 10 is an exemplary network representation of document clusters that is a possible output of a method for providing visual representations of textual information, according to an exemplary embodiment.

Document Clusters: FIG. 10 is an exemplary network representation 1000 of document clusters that is a possible output of a method for providing visual representations of textual information, according to an exemplary embodiment. Visualizing the documents in the corpus in a manner that reflects the similarities and differences between them is essential for efficient organization and navigation. In an exemplary embodiment, the spatial relations between the documents can be determined by comparing their embedding representations, which may range from a simple bag-of-words model to a modern pre-trained contextual text encoder. Instead of simply plotting a two-dimensional projection of these document embeddings, the documents may be clustered using their original high-dimensional representations, and the relative positions in the clustered space may be visualized.

The network representation 1000 illustrates such a cluster network of documents for the CFR corpus. The documents are centered around their corresponding cluster and colored by their facet. Nearby clusters are linked together, thus denoting their similarity, and a cluster can be collapsed interactively to simplify the view. The visual enables the user to reason, for example, "Why is an Aeronautics document grouped in a cluster with predominantly Federal Elections documents?" and provide feedback, thereby improving the tagging process in an active learning setting.

Figure 11:
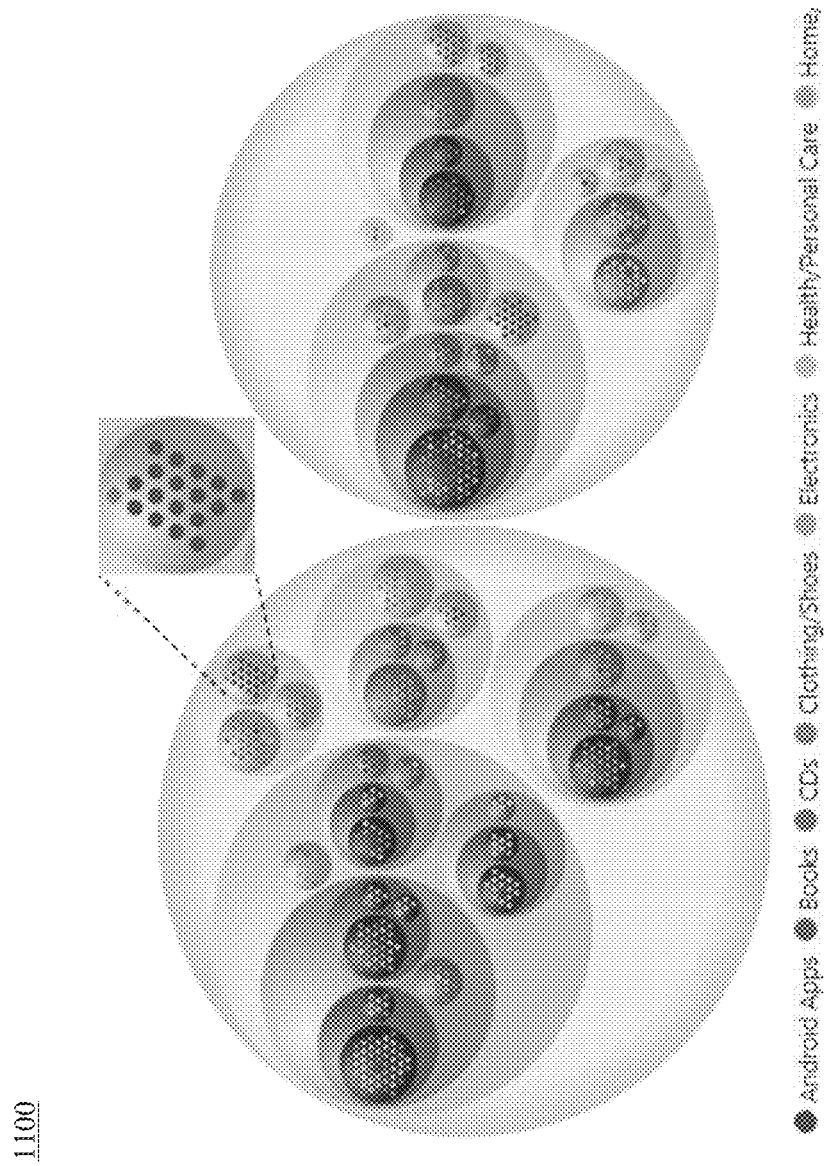
FIG. 11 is an exemplary nested topology diagram that depicts hierarchical relations between documents that is a possible output of a method for providing visual representations of textual information, according to an exemplary embodiment.

Document Hierarchy: FIG. 11 is an exemplary nested topology diagram 1100 that depicts hierarchical relations between documents that is a possible output of a method for providing visual representations of textual information, according to an exemplary embodiment. Examining the relationship between documents within a same cluster is critical to gaining granular insights about the corpus structure. Instead of partitioning the documents exclusively, a better alternative is to organize them in a hierarchical fashion, from generic to specific. This would empower users to decide the level of detail, as dictated by their target task. In an exemplary embodiment, the corpus is recursively partitioned in order to create hierarchical clusters, and a nested structure enclosure diagram is used to visualize the hierarchical clusters.

Each circle in the nested topology diagram 1100 denotes a hierarchical level, with the circles contained inside the same parent being more similar. Leaf level circles denote the documents and are colored by their facet. The user can zoom in to each circle and access the document content to explore anomalous patterns. For example, a user could investigate the reasons for the placement of an orange point that corresponds to "Clothing/Shoes" in the midst of violet points that correspond to "Android Apps" and observe that it was a data quality issue.

Figure 12:
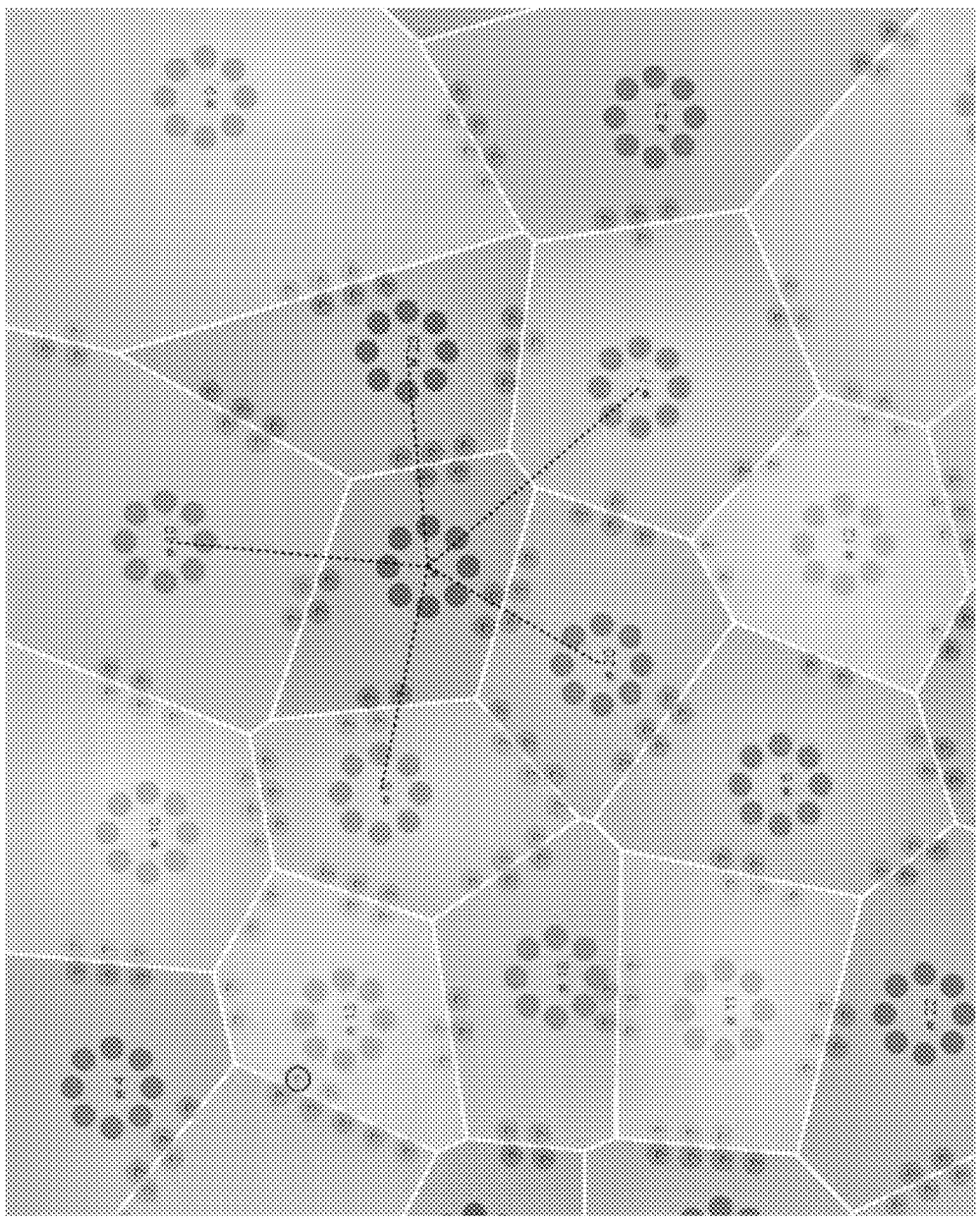
FIG. 12 is an exemplary Voronoi tessellation diagram that is a possible output of a method for providing visual representations of textual information, according to an exemplary embodiment.

Document Boundaries: FIG. 12 is an exemplary Voronoi tessellation diagram 1200 that is a possible output of a method for providing visual representations of textual information, according to an exemplary embodiment. Selecting the right data to label is important for annotation exercises and in active learning tasks. An effective strategy when sampling the data points is to identify points that are near decision boundaries. The idea is that such uncertain points may have subjective interpretation and hence are worthy of human attention. In an exemplary embodiment, a focus is placed on presenting such boundary documents to a user in conjunction with documents about which the machine is confident.

In an exemplary embodiment, the documents are first partitioned using a flat clustering algorithm based on their embedding representations. A convex hull encompassing the points in a cluster is then computed and the vertices of the hull are treated as the points of a cluster. For visualization, a Voronoi diagram is constructed by using the cluster centroids as seed points. Thus, each cluster is now visualized as a Voronoi cell bounded by a polygon with the polygon segments overlapping for nearby cells. The boundary points of a cluster are placed adjacent to the polygon sides while the interior points are arranged in a radial fashion at the center. The Voronoi diagram 1200 depicts this structure. The user can drill down to see details about the boundary points and the sampled interior points. The Voronoi cells adjacent to Cluster 1 are highlighted, signifying that the boundary points for this cluster may potentially be assigned to its neighbors such as Cluster 20 or Cluster 23.

Figure 13:
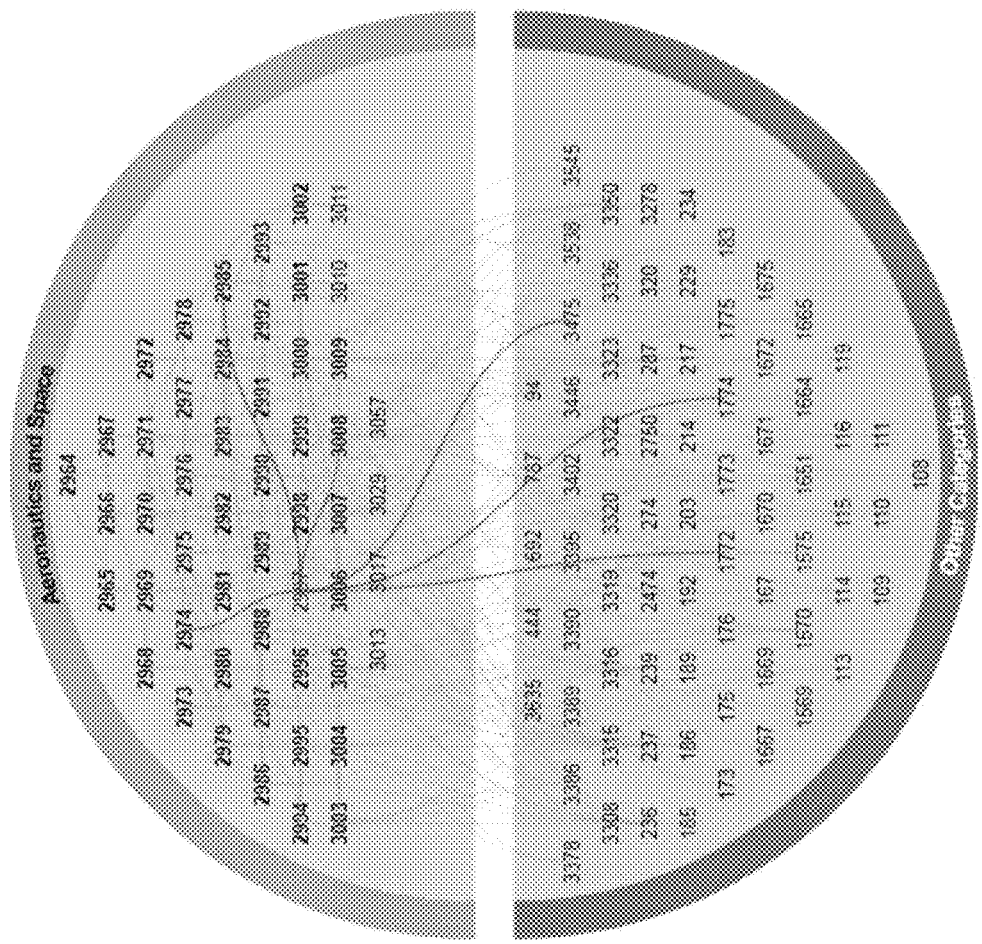
FIG. 13 is an exemplary diagram that illustrates intrarelationships and interrelationships between documents that is a possible output of a method for providing visual representations of textual information, according to an exemplary embodiment.

Document Relations: FIG. 13 is an exemplary diagram 1300 that illustrates intrarelationships and interrelationships between documents that is a possible output of a method for providing visual representations of textual information, according to an exemplary embodiment. All of the document-specific visualizations described above consider the corpus holistically. Sometimes it is required to anchor the analysis to a particular subset of the corpus and compare with the rest of the corpus in a one-versus-all setting. The diagram 1300 illustrates such intra- and inter-subset relations. The top hemisphere contains the identifications of documents only from the "Aeronautics and Space" subset of the CFR corpus. The documents from other subsets that are close to these documents in the embedding space are listed in the bottom hemisphere, with related documents being linked. The documents with strong intra-segment links are highlighted in a bold font. The user can analyze the similarities and differences between a select set of documents based on the link cues.

Accordingly, with this technology, an optimized process for providing visual representations of textual information such as hypergraphs, nested topologies, and tessellated planes is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for providing a visual representation of textual information, the method being implemented by a processor, the method comprising:
   receiving a corpus that includes at least one document containing textual information;
   analyzing the textual information; and
   generating a visual representation of the textual information based on a result of the analyzing of the textual information,
   wherein the visual representation includes at least one from among a hypergraph that encodes a distributional similarity between words included in the textual information, a clutter-free parallel coordinate plot of topic relations with respect to the textual information for which links are shown only for a topic of interest when a user hovers over the topic of interest and other elements are deemphasized, and a network cluster diagram that captures spatial relations between the textual information based on a comparison of embedding representations between the textual information.

2. The method of claim 1, wherein the analyzing comprises applying, to the textual information, a text analytics algorithm that is based on a classical linguistic pattern recognition method.

3. The method of claim 1, further comprising displaying the visual representation on a graphical user interface (GUI) that includes at least one mechanism for facilitating user interaction with the visual representation of the textual information.

4. The method of claim 3, wherein the GUI includes a first section that displays actions and customization options that are available to a user, a second section that displays the visual representation of the textual information, and a third section that displays contextual information that relates to the visual representation.

5. The method of claim 4, wherein the first section includes a drop-down menu that prompts a user to select a visual representation type from among a predetermined plurality of visual representation types.

6. The method of claim 3, wherein the at least one mechanism for facilitating user interaction includes a pan mechanism for shifting a central position of the visual representation.

7. The method of claim 1, wherein the generating of the visual representation comprises using at least one from among color coding, opacity, and line thickness for illustrating interrelationships between textual elements that are determined as a result of the analyzing of the textual information.

8. A computing apparatus for providing a visual representation of textual information, the computing apparatus comprising:
- a processor;
- a memory;
- a display; and
- a communication interface coupled to each of the processor, the memory, and the display,
- wherein the processor is configured to:
  - receive, via the communication interface, a corpus that includes at least one document containing textual information;
  - analyze the textual information; and
  - generate a visual representation of the textual information based on a result of the analysis of the textual information,
- wherein the visual representation includes at least one from among a hypergraph that encodes a distributional similarity between words included in the textual information, a clutter-free parallel coordinate plot of topic relations with respect to the textual information for which links are shown only for a topic of interest when a user hovers over the topic of interest and other elements are deemphasized, and a network cluster diagram that captures spatial relations between the textual information based on a comparison of embedding representations between the textual information.

9. The computing apparatus of claim 8, wherein the processor is further configured to apply, to the textual information, a text analytics algorithm that is based on a classical linguistic pattern recognition method.

10. The computing apparatus of claim 8, wherein the processor is further configured to display, on the display, the visual representation on a graphical user interface (GUI) that includes at least one mechanism for facilitating user interaction with the visual representation of the textual information.

11. The computing apparatus of claim 10, wherein the GUI includes a first section that displays actions and customization options that are available to a user, a second section that displays the visual representation of the textual information, and a third section that displays contextual information that relates to the visual representation.

12. The computing apparatus of claim 11, wherein the first section includes a drop-down menu that prompts a user to select a visual representation type from among a predetermined plurality of visual representation types.

13. The computing apparatus of claim 10, wherein the at least one mechanism for facilitating user interaction includes a pan mechanism for shifting a central position of the visual representation.

14. The computing apparatus of claim 8, wherein the processor is further configured to generate the visual representation by using at least one from among color coding, opacity, and line thickness for illustrating interrelationships between textual elements that are determined as a result of the analysis of the textual information.

15. A non-transitory computer readable storage medium storing instructions for providing a visual representation of textual information, the storage medium comprising executable code which, when executed by a processor, causes the processor to:
- receive a corpus that includes at least one document containing textual information;
- analyze the textual information; and
- generate a visual representation of the textual information based on a result of the analysis of the textual information,
- wherein the visual representation includes at least one from among a hypergraph that encodes a distributional similarity between words included in the textual information, a clutter-free parallel coordinate plot of topic relations with respect to the textual information for which links are shown only for a topic of interest when a user hovers over the topic of interest and other elements are deemphasized, and a network cluster diagram that captures spatial relations between the textual information based on a comparison of embedding representations between the textual information.

16. The storage medium of claim 15, wherein the executable code is further configured to cause the processor to apply, to the textual information, a text analytics algorithm that is based on a classical linguistic pattern recognition method.

17. The storage medium of claim 15, wherein the executable code is further configured to cause the processor to display the visual representation on a graphical user interface (GUI) that includes at least one mechanism for facilitating user interaction with the visual representation of the textual information.

* * * * *